United States Patent
Liu et al.

(10) Patent No.: US 12,393,760 B1
(45) Date of Patent: Aug. 19, 2025

(54) WIRE DENSITY-AWARE LAYER ASSIGNMENT

(71) Applicant: Cadence Design Systems, Inc., San Jose, CA (US)

(72) Inventors: Derong Liu, Austin, TX (US); Wing-Kai Chow, Austin, TX (US); Gracieli Posser, Austin, TX (US); Mehmet Can Yildiz, Austin, TX (US); Charles Jay Alpert, Cedar Park, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 634 days.

(21) Appl. No.: 17/858,545

(22) Filed: Jul. 6, 2022

(51) Int. Cl.
*G06F 30/392* (2020.01)

(52) U.S. Cl.
CPC .................. *G06F 30/392* (2020.01)

(58) Field of Classification Search
CPC .................................... G06F 30/392
USPC ......................................... 716/119
See application file for complete search history.

(56) References Cited

U.S. PATENT DOCUMENTS 10,997,352 B1 * 5/2021 Posser ................... G06F 30/327
2023/0059055 A1 * 2/2023 Reddy ................... G06F 30/398

* cited by examiner

*Primary Examiner* — Eric D Lee
(74) *Attorney, Agent, or Firm* — Schwegman Lundberg & Woessner, P.A.

(57) ABSTRACT

Aspects of the present disclosure address systems and methods for density-aware layer assignment for integrated circuit (IC) designs. Data describing an IC design is accessed. The IC design comprises a net and a set of routing layers. Single-layer routing and an initial layer assignment is performed on the set of nets. The single-layer routing and the initial layer assignment comprises generating a route for a net from the set of nets and assigning the route to one or more layers from the set of layers. A multi-layer density map is generated based on the single-layer routing and the initial layer assignment on the set of nets. Incremental layer reassignment is performed on the set of nets based on the multi-layer density map. The incremental layer assignment comprises reassigning a segment of the route from the first layer to a second layer from the set of layers based on the density value.

20 Claims, 6 Drawing Sheets

WIRE DENSITY-AWARE LAYER ASSIGNMENT

TECHNICAL FIELD

The present disclosure generally relates to the technical field of integrated circuit (IC) design. In particular, the present disclosure addresses systems and methods for wire density-aware layer assignment for IC designs.

BACKGROUND

An integrated circuit (IC) comprises cells of similar and/or various sizes, and connections between or among the cells. A cell includes several pins interconnected by wires to pins of one or more other cells. A design netlist describes the logical connectivity between cells in an IC design. A netlist can include a set of nets and each net includes two or more interconnected pins in the IC design.

Design engineers design ICs by transforming circuit descriptions of the ICs into geometric descriptions, called layouts. To create layouts, design engineers typically use electronic design automation (EDA) applications. These applications provide sets of computer-based tools for creating, editing, and analyzing IC design layouts.

EDA applications create layouts by using geometric shapes that represent different materials and devices on IC's. For instance, EDA tools commonly use rectilinear lines to represent the wire segments that interconnect the IC components. These tools also represent electronic and circuit IC components as geometric objects with varying shapes and sizes.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The IC design process generally entails various operations. Some of the physical-design operations that EDA applications commonly perform to obtain the IC layouts are: (1) circuit partitioning, which partitions a circuit if the circuit is too large for a single chip; (2) floor planning, which finds the alignment and relative orientation of the circuit modules; (3) placement, which determines more precisely the positions of the circuit components; (4) routing, which completes the interconnections between or among the circuit components by determining precise connection paths for each net; and (5) verification, which checks the layout to ensure that it meets design and functional requirements.

As noted above, routing is a key operation in the physical design cycle. Advanced IC designs can comprise multiple layers in which routing can be performed. Routing often includes a layer assignment process whereby each net's routing path is assigned to one or more layers to limit routing of the net to the assigned layers. Conventional approaches to layer assignment do not account for the relationship between timing and wire density. As a result, wires are poorly distributed among all layers of the design and certain layers can be overly congested with wires thereby causing timing degradations due to coupling capacitance and other factors.

Aspects of the present disclosure address problems with conventional approaches to layer assignment by performing wire density-aware layer assignment. Consistent with some embodiments, a method corresponding to this improved approach to layer assignment comprises accessing data describing an integrated circuit design that includes a set of nets and a set of layers. The method further includes performing single-layer routing and an initial layer assignment for the set of nets. A multi-layer density map is generated based on the single-layer routing and the initial layer assignment. The multi-layer density map comprises a set of density values, each of which is mapped to a region (e.g., a grid cell) of a layer of the design. That is, the multi-layer density map comprises a density value for each region of each layer of the design. Each density value provides a measure of wire density for a given region of a layer of the design. Incremental layer reassignment is performed on the set of nets based on the multi-layer density map. The incremental layer assignment may include reassigning a segment of a route generated during single-layer routing from a first layer assigned to the route during the initial layer assignment to a second layer from the set of layers based on an aggregate density value associated with the second layer. The data is updated based on the incremental layer reassignment. Performing layer assignment in accordance with the methodology described above and herein improves the distribution of wires among the set of layers of a design thereby improving wire density and timing in the design.

Figure 1:
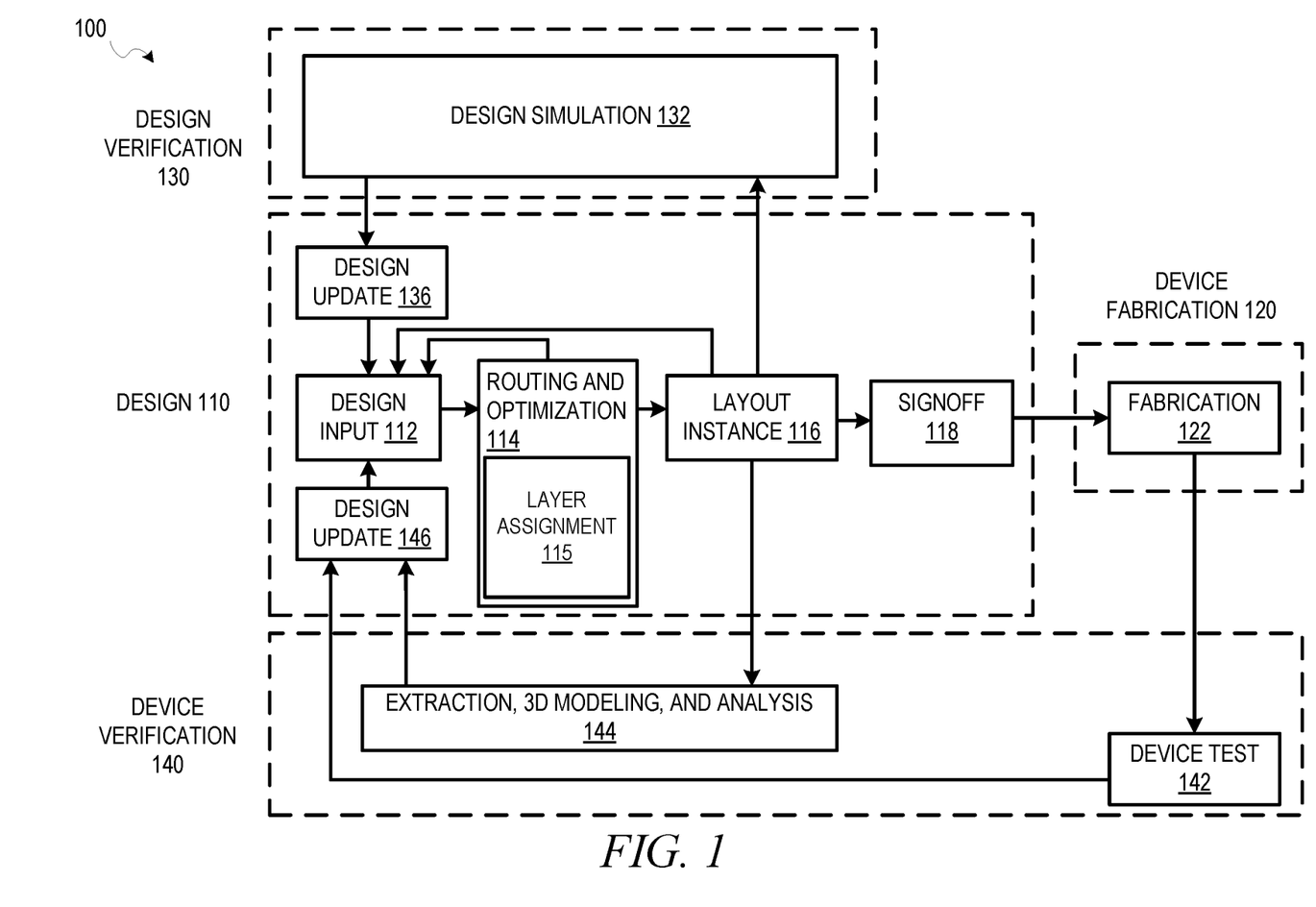
FIG. 1 is a diagram illustrating an example IC design process flow that includes wire density-aware layer assignment, according to some embodiments.

FIG. 1 is a diagram illustrating an example IC design process flow that includes wire density-aware layer assignment, according to some embodiments. As shown, the design process flow 100 includes a design phase 110, a device fabrication phase 120, a design verification phase 130, and a device verification phase 140. The design phase 110 involves an initial design input operation 112 where the basic elements and functionality of a device are determined, as well as revisions based on various analyses and optimizations of a circuit design. This design input operation 112 is where block instances are used in the circuit design and any additional circuitry for the design around the blocks is selected. The initial strategy, tactics, and context for the device to be created are also generated in the design input operation 112, depending on the particular design algorithm to be used.

In some embodiments, following an initial selection of design values in the design input operation 112, routing and optimization are performed in at operation 114, along with any other automated design processes. While the design process flow 100 shows the routing and optimization operation 114 occurring prior to a layout instance 116, routing and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118 discussed below.

The routing and optimization operation 114 generally includes a layer assignment process 115 whereby net routing paths are assigned to specific layers. Single-layer routing and initial layer assignment may be performed on a set of nets specified by a netlist. As an example of single-layer routing and initial layer assignment, a single-layer route that connects pins of a net is generated and at least a segment of the route is assigned to a first layer of the IC design. Incremental layer reassignment based on wire density may be performed based on the single-layer routing and initial layer assignment. As an example, density values for regions of each layer are determined and incremental layer assignment may include reassigning the segment of the route to a second layer based on the segment passing through a dense region of the first layer (e.g., a layer with a density value that exceeds a threshold density value). The second layer may be selected for reassignment of the segment based on scores calculated for layers of the design. A score for a given layer is calculated based on an aggregate of density values in the layer and a jogging penalty that accounts for impacts on timing and congestions in view of vias used to transition a route between layers.

After design inputs are used in the design input operation 112 to generate a circuit layout, and any of the routing and optimization operations 114 are performed, a layout is generated in the layout instance 116. The layout describes the physical layout dimensions of the device that match the design inputs. Prior to this layout being provided to a fabrication operation 122, the signoff 118 is performed on the circuit design defined by the layout.

After signoff verification by the signoff 118, a verified version of the layout is used in the fabrication operation 122 to generate a device, or additional testing and design updates may be performed using designer inputs or automated updates based on design simulation 132 operations or extraction, 3D modeling, and analysis operations 144. Once the device is generated, the device can be tested as part of device test operation 142 and layout modifications generated based on actual device performance.

A design update 136 from the design simulation 132 operations; a design update 146 from the device test operation 142 or the extraction, 3D modeling, and analysis operations 144; or the design input operation 112 may occur after the initial layout instance 116 is generated. In various embodiments, whenever design inputs are used to update or change an aspect of a circuit design, a timing analysis and the routing and optimization operation 114 may be performed.

Figure 2:
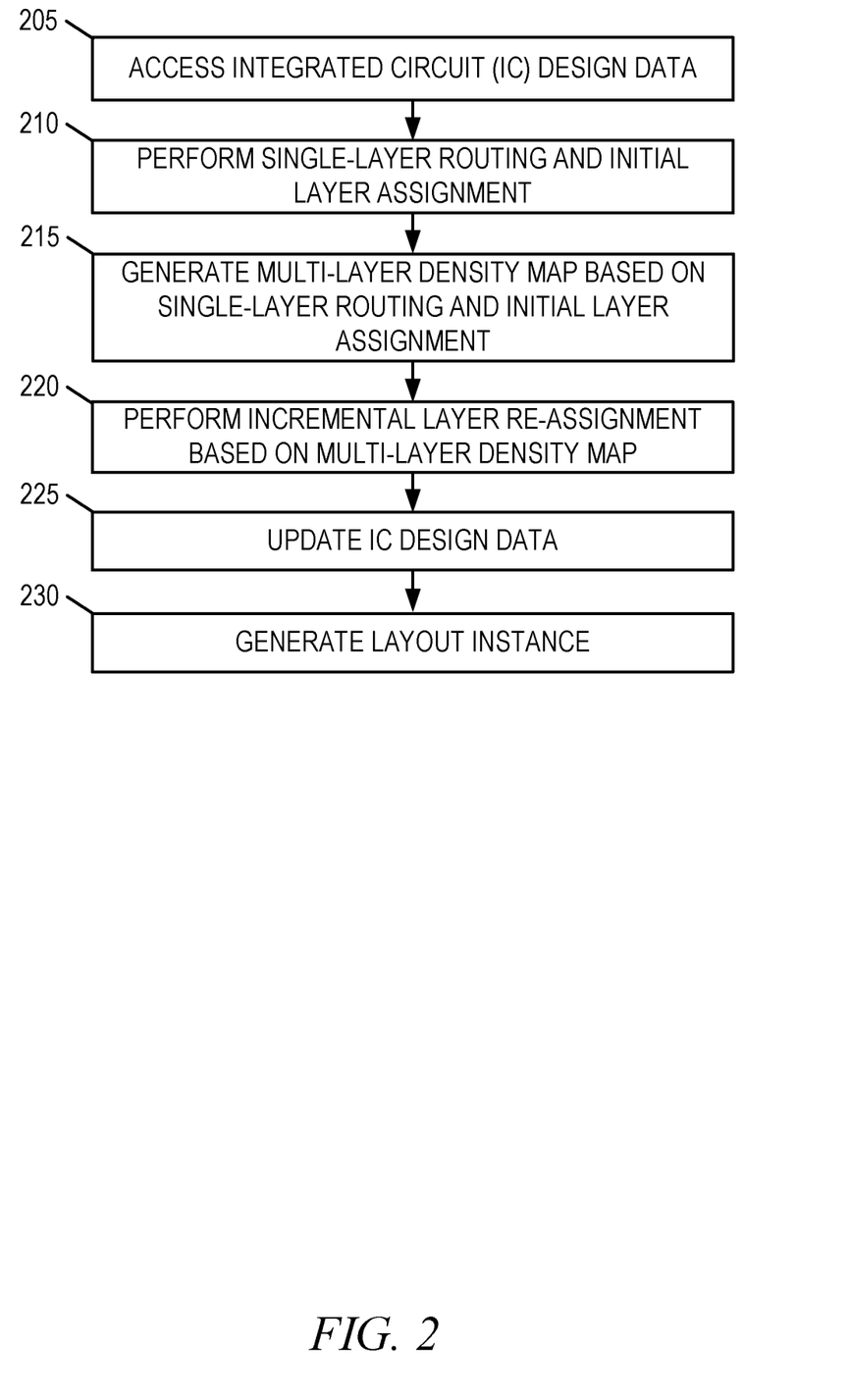
FIGS. 2-4 are flowcharts illustrating operations of a method for layer assignment based on wire density, according to some example embodiments.
Figure 3:
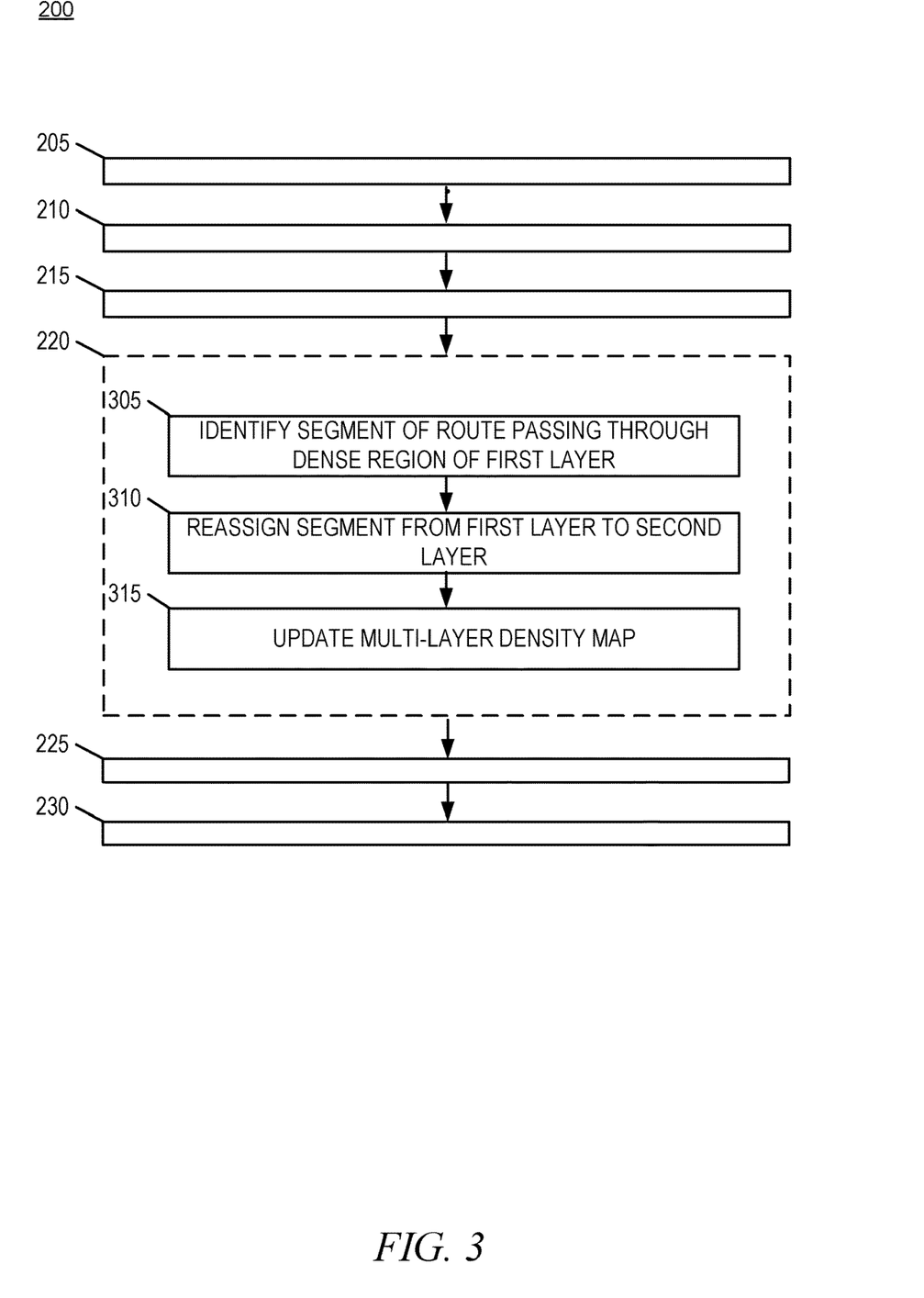
Figure 4:
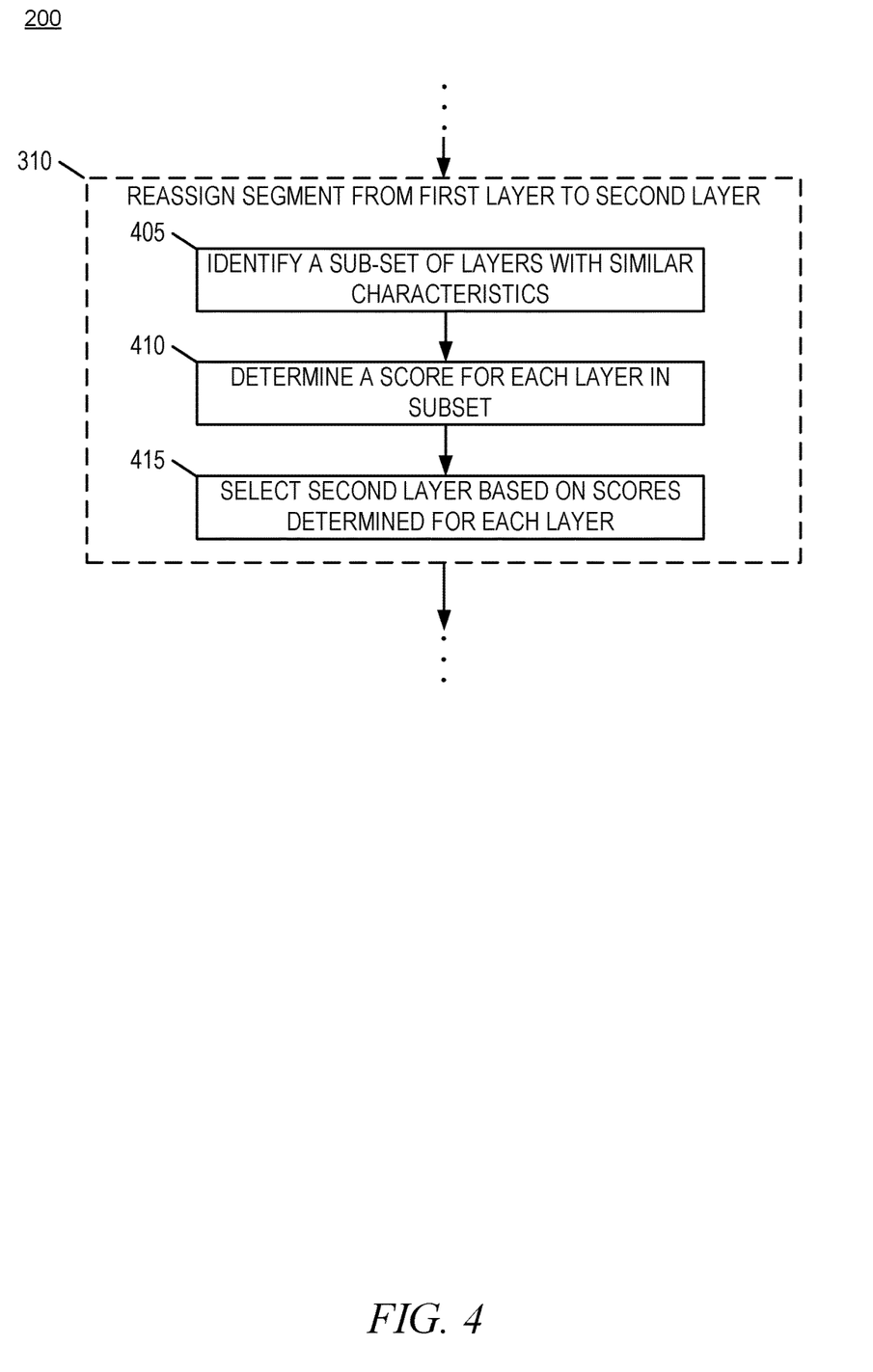

FIGS. 2-4 are flowcharts illustrating operations of a method 200 for layer assignment based on wire density, according to some example embodiments. For some embodiments, the method 200 is performed as part of a placement process applied to a circuit design (e.g., by an EDA software system). It will be understood that the method 200 may be performed by a device, such as a computing device executing instructions of an EDA software system. For instance, the operations the method 200 may be represented by executable instructions (e.g., EDA software) that, when executed by a processor of a computing device, cause the computing device to perform the method. Thus, an operation of the method 200 may be performed by a hardware processor (e.g., central processing unit or graphics processing unit) of a computing device (e.g., desktop, server, etc.). Accordingly, the method 200 is described below with reference to such a computing device.

Depending on the embodiment, an operation of the method 200 may be repeated in different ways or involve intervening operations not shown. Though the operations of the method 200 may be depicted and described in a certain order, the order in which the operations are performed may vary among embodiments, including performing certain operations in parallel.

The method 200 as illustrated begins at operation 205 where the computing device accesses data describing an integrated circuit (IC) design (also referred to herein as "IC design data") from memory. The IC design data can comprise or correspond to one or more IC design files stored in memory. The IC design data includes a netlist that includes a set of nets. Each net specifies a connection between at least two pins. The IC design data further specifies a set of layers in which nets of the IC design can be routed. Each layer has a predetermined number of tracks on which routes or other metal objects may be placed.

At operation 210, the computing device performs single-layer routing and initial layer assignment on the set of nets. In performing single-layer routing and the initial layer assignment, the computing device generates a single-layer route for each net and assigns each route to a one or more layers from among the set of layers. For example, the computing device may generate a route for a net in the netlist and assign the route to one or more layers from the set of layers.

The computing device generates a multi-layer density map based on the single-layer routing and the initial layer assignment on the set of nets, at operation 215. The multi-layer density map comprises a set of density values where each density value is mapped to each region of each layer of the IC design. For example, each layer may be organized into a set of grid cells, and the density map includes a density value for each grid cell. Accordingly, the generating of the multi-layer density map comprises determining a density value for each region (e.g., each grid cell) of each layer of the IC design. Each density value provides a measure of wire density of a region (e.g., grid cell) of a layer. The computing device can determine the density value based on a ratio of a total number of tracks in the region and a number of used tracks in the region (e.g., tracks on which a route is placed during single-layer routing and layer assignment). For example, the computing device can determine a density value as follows:

Density Value=# of used tracks in region/total # of tracks in region

The computing device, at operation 220, performs incremental layer reassignment on the set of nets based on the multi-layer density map. In performing the incremental layer assignment on the set of nets, the computing device may reassign one or more segments of one or more routes to a different layer in the design based on one or more density values in the multi-layer density map. For example, the computing device may reassign a segment of a route from a first layer to a second layer based on an aggregate of density values in the second layer. Further details regarding the incremental layer assignment are discussed below in reference to FIGS. 3 and 4.

At operation 225, the computing device updates the IC design data based on the incremental layer assignment. In updating the IC design data, the computing device updates the IC design data with data describing the result of operations 210-220. The computing device, at operation 230, generates a design layout instance for the IC device design based in part on the incremental layer assignment. The layout describes the physical layout dimensions of the IC device.

As shown in FIG. 3, the method 200 may, in some embodiments, further include operations 305, 310, and 315. For some embodiments, the operations 305, 310, and 315 are performed as part of operation 220 where the computing device performs incremental layer re-assignment on the set of nets based on the multi-layer density map. At operation 305, the computing device identifies a segment of a route (generated during single-layer routing) that passes through a dense region (e.g., a dense grid-cell) of a first layer. The computing device determines whether a given region of a layer is a dense region based on whether the density value associated with the region exceeds a predetermined threshold density value.

Based on the segment of the route passing through the dense region, the computing device reassigns the segment of the route from the first layer to a second layer, at operation 310. As will be discussed below, the computing device may select the second layer based on a score computed for the second layer based on a jogging penalty and an aggregate density value of the second layer (e.g., comprising a combination of density values in the second layer).

At operation 315, the computing device updates the multi-layer density map based on reassigning the segment of the route from the first layer to the second layer. In updating the multi-layer density map, the computing device updates one or more density values based on the segment being moved to the second layer. For example, the computing device recomputes the density value of the region from which the segment is moved along with any additional regions of the second layer to which the segment of the route is moved.

Although only a single segment of a single route is addressed above, it shall be appreciated that the operations 305, 310, and 315 can be repeated in one or more iterations such that additional segments of the same or other routes may be identified and reassigned to different layers and the density map is updated at each iteration.

As shown in FIG. 4, the method 200 can, in some embodiments, further include operations 405, 410, and 415. Consistent with these embodiments, the operations 405, 410, and 415 can be performed as part of the operation 310 where the computing device reassigns the segment of the route from the first layer to the second layer. At operation 405, the computing device identifies a subset of layers from the set of layers based on characteristics of the layers. More specifically, the computing device identifies layers with similar characteristics. For example, the computing device may identify layers with the same RC values or identify layers with RC values within a certain range of RC values.

The computing device, at operation 410, scores each layer in the subset of layers. That is, the computing device determines a score for each layer in the subset of layers. For example, the computing device can determine a score for a given layer based on a combination of a sum of density values in the layer and a jogging penalty. The jogging penalty comprises a combination of a predetermined weighting value and a number of layers between an initial layer to which the segment is assignment and a given layer for which the score is being computed. For example, the computing device can determine a score for the second layer based on a combination of the aggregated density value of the second layer (the sum of density values in the second layer) and the jogging penalty where the jogging penalty comprises a combination of the predetermined weighting value and the number of layers between the first layer and the second layer.

At operation 415, the computing device selects the second layer for reassignment of the segment of the route based on the scores determined for the subset of layers. For some embodiments, the computing device can select the layer with the lowest score as the layer to which the segment of the route is reassigned.

Figure 5A:
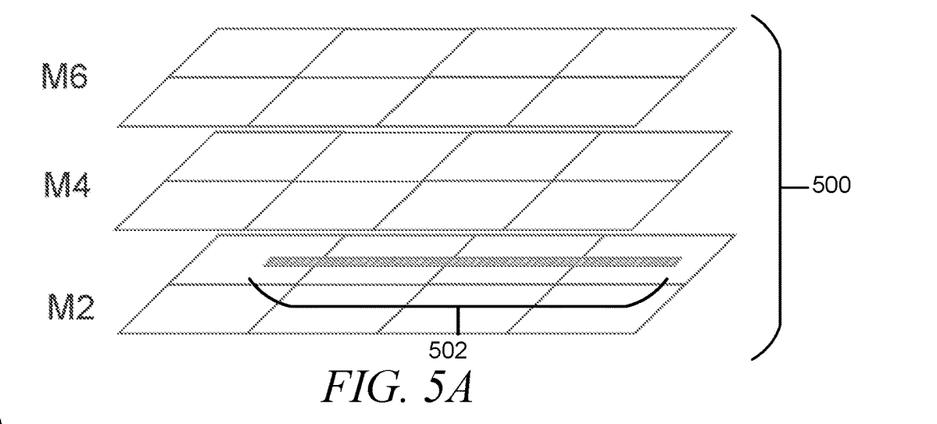
FIGS. 5A-5C are conceptual diagrams illustrating an example method for layer assignment based on wire density, according to some example embodiments.
Figure 5B:
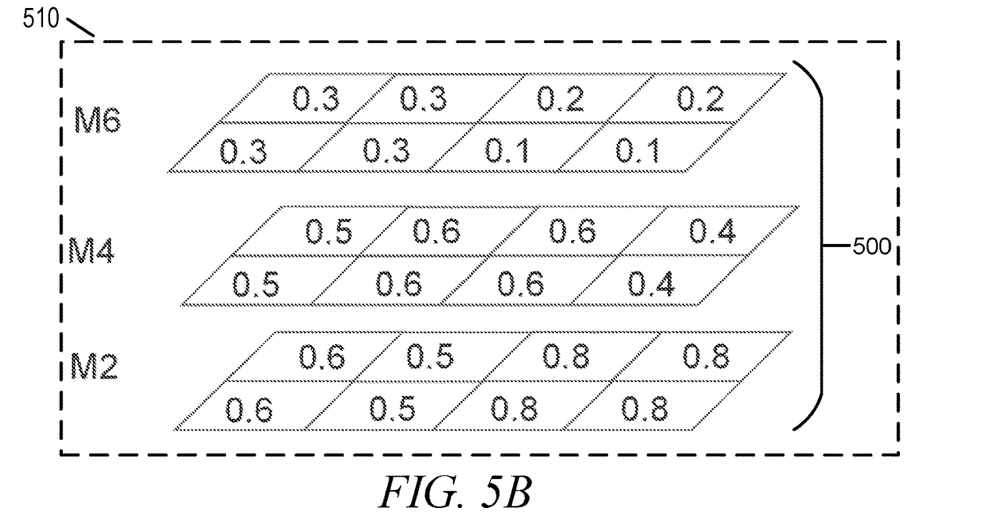
Figure 5C:
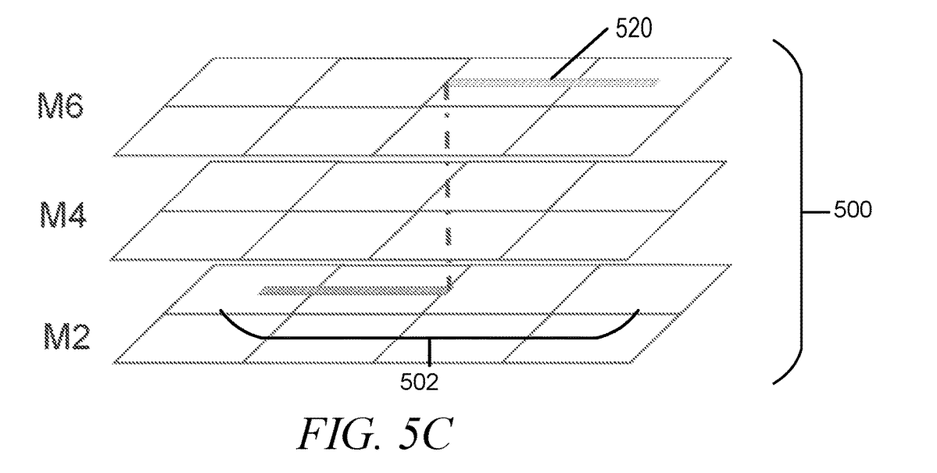

FIGS. 5A-5C are conceptual diagrams illustrating an example of the method 200 for layer assignment based on wire density, according to some example embodiments. FIG. 5A illustrates a portion of an integrated circuit design comprising a set of layers 500 and a single-layer route 502 for connecting pins of a net specified by a netlist of the integrated circuit design. The set of layers 500 include layers M2, M4, and M6, each of which is organized into a set of grid cells. Each grid cell has a predetermined number of tracks on which routing paths may be placed. The single-layer route 502 is generated (e.g., by the computing device discussed above in reference to the method 200) during single-layer routing and a portion of the route 502 is assigned to the layer M2 during initial layer assignment (performed at operation 210).

FIG. 5B illustrates a multi-layer density map 510 generated based on the single-layer routing and initial layer assignment (at operation 215). As shown, the multi-layer density map 510 includes the set of layers 500 (layers M6, M4, and M2) along with a density value for each grid cell in each layer. As discussed above, a density value provides a measure of wire density in the corresponding grid cell and is calculated based on a ratio of used tracks in a grid cell to a total number of tracks in the grid cell.

FIG. 5C illustrates a result of performing incremental layer reassignment on the net based on the multi-layer density map 510 (at operation 220). In particular, as shown, a segment 520 of the route 502 is reassigned to the layer M6 based on the multi-layer density map 510. In performing the incremental layer reassignment, the computing device identifies the segment 520 of the route 502 as passing through a dense region based on the density values of the grid cells in which the segment 520 is initially assigned based on the initial layer assignment. More specifically, the density values of the grid cells (both illustrated as 0.8) exceeds a predefined threshold density value.

The computing devices selects layer M6 for reassignment of the segment 520 based on a comparison of scores generated for layers M4 and M6. As described above, the computing device determines a score for a given layer based on a sum of density values in the routing region of the layer (indicated in FIG. 5B) and a jogging penalty that comprises a combination of a predetermined weighting value and a number of layers between the layer and layer M2 (the initial layer to which the route 502 is assigned). For example, for M6, the sum of density values is 0.4 (0.2+0.2) and the number of layers between M6 and M2 is 4. The computing device may select M6 based on the score for M6 being lowest among remaining layers.

Figure 6:
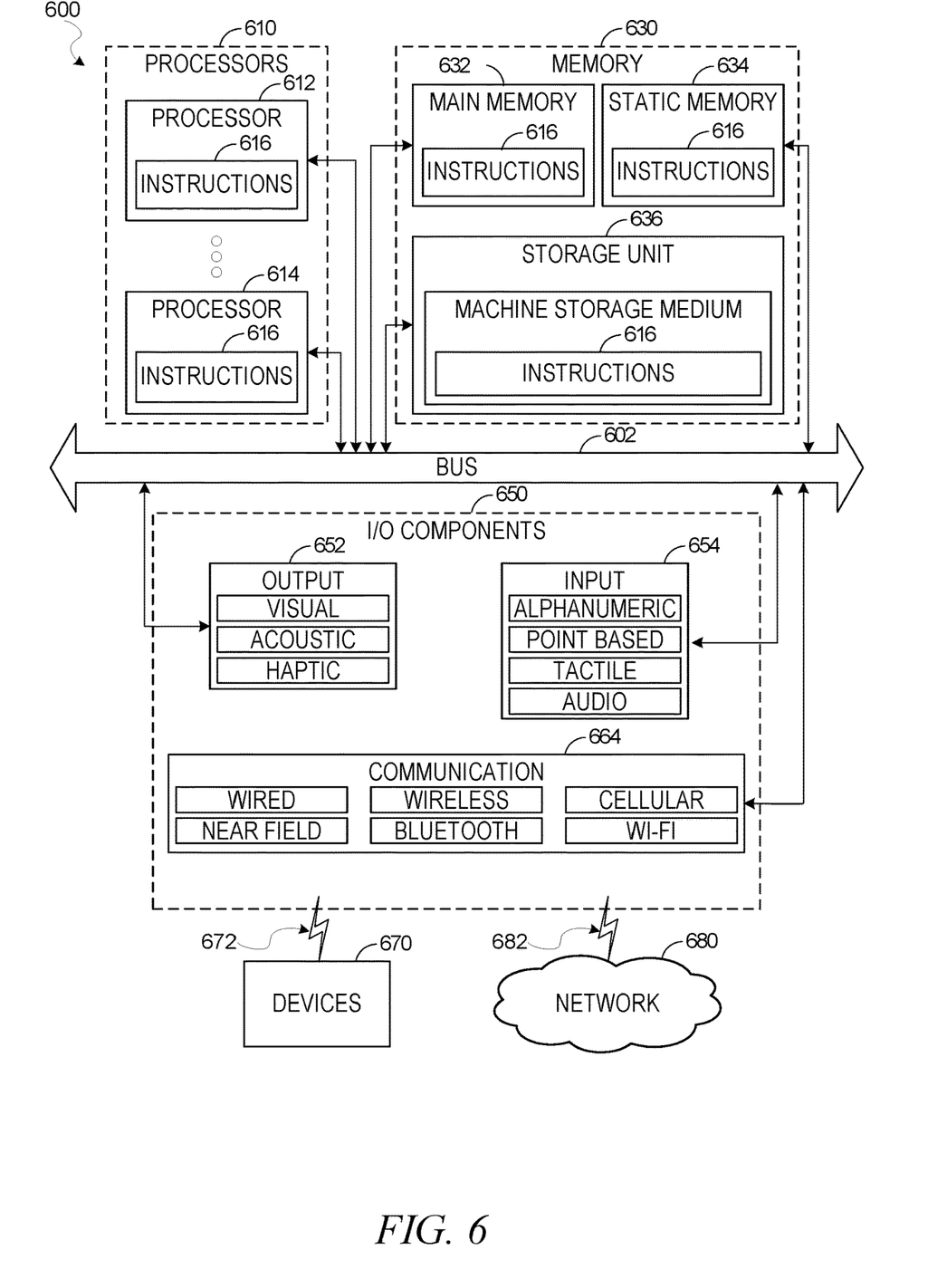
FIG. 6 is a diagrammatic representation of a machine in the example form of a computer system within which a set of instructions for causing the machine to perform any one or more of the methodologies discussed herein may be stored and executed.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute an EDA software system that executes the method 200. Additionally, or alternatively, the instructions 616 may implement the design flow of FIG. 1. The instructions 616 transform the general, non-programmed machine 600 into a particular machine 600 programmed to carry out the described and illustrated functions in the manner described here. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, and other communication components (NFC, Bluetooth, and Wi-Fi) to provide communication via other modalities. The devices 670 may be another machine or any of a wide variety of peripheral devices (e.g., a peripheral device coupled via a universal serial bus (USB)).

Executable Instructions and Machine-Storage Medium

The various memories (e.g., 630, 632, 634, and/or memory of the processor(s) 610) and/or the storage unit 636 may store one or more sets of instructions and data structures (e.g., software) embodying or utilized by any one or more of the methodologies or functions described herein. These instructions, when executed by the processor(s) 610, cause various operations to implement the disclosed embodiments.

The terms "machine-storage medium," "device-storage medium," and "computer storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "transmission medium" discussed below.

Transmission Medium

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public-switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
one or more processors of a machine; and
a computer storage medium storing instructions, which when executed by the machine, cause the machine to perform operations comprising:
accessing, from memory, data describing an integrated circuit design, the integrated circuit design comprising a set of nets and a set of layers;
performing single-layer routing and initial layer assignment on the set of nets, the performing of the single-layer routing and initial layer assignment comprising generating a route for a net from the set of nets and assigning the route to one or more layers from the set of layers;
generating a multi-layer density map based on the single-layer routing and the initial layer assignment on the set of nets, the multi-layer density map comprises a set of density values, a density value from the set of density values providing a measure of wire density within a region of a first layer of the set of layers;
performing incremental layer reassignment on the set of nets based on the multi-layer density map, the performing of incremental layer reassignment comprising reassigning a segment of the route from the first layer to a second layer from the set of layers based on the density value, the reassigning the segment of the route from the first layer to the second layer comprising:
scoring each layer in a subset of layers, the scoring of each layer comprising determining a score for the second layer based on an aggregate density value of the second layer and a jogging penalty, the jogging penalty comprising a combination of a predetermined weight and a number of layers between the second layer and the first layer; and
selecting the second layer based on the score for the second layer; and
updating the data based on the incremental layer reassignment.

2. The system of claim 1, wherein the generating of the multi-layer density map comprises determining the density value for the region of the layer based on a number of total tracks in the region and a number of used tracks in the region.

3. The system of claim 2, wherein determining the density value comprises determining a ratio of the number of used tracks in the region to the number of total tracks in the region.

4. The system of claim 1, wherein the incremental layer reassignment further comprises:
identifying the segment of the route based on the density value of the region of the first layer; and
updating the multi-layer density map based on the reassigning of the segment of the route from the first layer to the second layer.

5. The system of claim 4, wherein identifying the segment comprises determining the density value of the region of the first layer exceeds a predefined threshold density value.

6. The system of claim 4, wherein updating the multi-layer density map comprises updating one or more density values in the set of density values based on the reassigning of the segment of the route from the first layer to the second layer.

7. The system of claim 1, wherein the reassigning of the segment of the route to the second layer further comprises:
identifying the subset of layers based on a similarity of characteristics of layers among the set of layers.

8. The system of claim 1, wherein the operations further comprise:
generating a layout instance for the integrated circuit design based on the incremental layer reassignment, the layout instance describing physical dimensions of a device based on the integrated circuit design.

9. A method comprising:
accessing, from memory, data describing an integrated circuit design, the integrated circuit design comprising a set of nets and a set of layers;
performing single-layer routing and initial layer assignment on the set of nets, the performing of the single-layer routing and initial layer assignment comprising generating a route for a net from the set of nets and assigning the route to one or more layers from the set of layers;
generating a multi-layer density map based on the single-layer routing and the initial layer assignment on the set of nets, the multi-layer density map comprises a set of density values, a density value from the set of density values providing a measure of wire density within a region of a first layer of the set of layers;
reassigning a segment of the route from the first layer to a second layer from the set of layers based on the multi-layer density map, the reassigning the segment of the route from the first layer to the second layer comprising:
scoring each layer in a subset of layers, the scoring of each layer comprising determining a score for the second layer based on an aggregate density value of the second layer and a jogging penalty, the jogging penalty comprising a combination of a predetermined weight and a number of layers between the second layer and the first layer; and
selecting the second layer based on the score for the second layer; and
updating the data based on the reassigning of the segment of the route from the first layer to a second layer.

10. The method of claim 9, wherein the generating of the multi-layer density map comprises determining the density value for the region of the layer based on a number of total tracks in the region and a number of used tracks in the region.

11. The method of claim 10, wherein determining the density value comprises determining a ratio of the number of used tracks in the region to the number of total tracks in the region.

12. The method of claim 9, further comprising:
identifying the segment of the route based on the density value of the region of the first layer; and updating the multi-layer density map based on the reassigning of the segment of the route from the first layer to the second layer.

13. The method of claim 12, wherein identifying the segment comprises determining the density value of the region of the first layer exceeds a predefined threshold density value.

14. The method of claim 12, wherein updating the multi-layer density map comprises updating one or more density values in the set of density values based on the reassigning of the segment of the route from the first layer to the second layer.

15. The method of claim 9, wherein the reassigning of the segment of the route to the second layer further comprises:
   identifying the subset of layers based on a similarity of characteristics of layers among the set of layers.

16. A computer storage medium storing instructions, which when executed by a machine, cause a machine to perform operations comprising:
   accessing, from memory, data describing an integrated circuit design, the integrated circuit design comprising a set of nets and a set of layers;
   performing single-layer routing and initial layer assignment on the set of nets, the performing of the single-layer routing and initial layer assignment comprising generating a route for a net from the set of nets and assigning the route to one or more layers from the set of layers;
   generating a multi-layer density map based on the single-layer routing and the initial layer assignment on the set of nets, the multi-layer density map comprises a set of density values, a density value from the set of density values providing a measure of wire density within a region of a first layer of the set of layers;
   performing incremental layer reassignment on the set of nets based on the multi-layer density map, the performing of incremental layer reassignment comprising reassigning a segment of the route from the first layer to a second layer from the set of layers based on the density value, the reassigning the segment of the route from the first layer to the second layer comprising:
      scoring each layer in a subset of layers, the scoring of each layer comprising determining a score for the second layer based on an aggregate density value of the second laver and a jogging penalty, the jogging penalty comprising a combination of a predetermined weight and a number of layers between the second layer and the first layer; and
      selecting the second layer based on the score for the second layer; and
   generating a layout instance for the integrated circuit design based on the incremental layer reassignment, the layout instance describing physical dimensions of a device based on the integrated circuit design.

17. The computer storage medium of claim 16, wherein the generating of the multi-layer density map comprises determining the density value for the region of the layer based on a number of total tracks in the region and a number of used tracks in the region.

18. The computer storage medium of claim 17, wherein determining the density value comprises determining a ratio of the number of used tracks in the region to the number of total tracks in the region.

19. The computer storage medium of claim 16, wherein the incremental layer reassignment further comprises:
   identifying the segment of the route based on the density value of the region of the first layer; and
   updating the multi-layer density map based on the reassigning of the segment of the route from the first layer to the second layer.

20. The computer storage medium of claim 19, wherein identifying the segment comprises determining the density value of the region of the first layer exceeds a predefined threshold density value.

* * * * *